(12) United States Patent
Yang et al.

(10) Patent No.: US 10,574,138 B2
(45) Date of Patent: Feb. 25, 2020

(54) POWER CONVERTER, POWER CONVERTING SYSTEM, AND POWER CONVERTER CONTROL METHOD

(71) Applicant: DELTA ELECTRONICS, INC., Taoyuan (TW)

(72) Inventors: Chia-Cheng Yang, Taoyuan (TW); Chen-Bin Huang, Taoyuan (TW); Jui-Teng Chan, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 30 days.

(21) Appl. No.: 16/149,152

(22) Filed: Oct. 2, 2018

(65) Prior Publication Data
US 2019/0103809 A1   Apr. 4, 2019

Related U.S. Application Data

(60) Provisional application No. 62/567,593, filed on Oct. 3, 2017.

(30) Foreign Application Priority Data

Jun. 21, 2018   (CN) .......................... 2018 1 0642039

(51) Int. Cl.
   *H02M 3/158*   (2006.01)
   *H02M 3/04*    (2006.01)
   *H02M 1/00*    (2006.01)

(52) U.S. Cl.
   CPC ............. *H02M 3/04* (2013.01); *H02M 3/158* (2013.01); *H02M 2001/0019* (2013.01); *H02M 2001/0022* (2013.01); *H02M 2001/0025* (2013.01)

(58) Field of Classification Search
   CPC ............... H02M 3/156; H02M 3/1563; H02M 2001/0009; H02M 2001/0025; H02M 3/158; H02M 1/00
   See application file for complete search history.

(56) References Cited

U.S. PATENT DOCUMENTS

| | | | |
|---|---|---|---|
| 6,191,567 B1 * | 2/2001 | Sluijs | H02M 3/1582 323/259 |
| 6,636,431 B2 * | 10/2003 | Seki | H02M 1/083 323/259 |

(Continued)

FOREIGN PATENT DOCUMENTS

| | | |
|---|---|---|
| CN | 104600780 A | 5/2015 |
| TW | M543799 U | 6/2017 |

*Primary Examiner* — Adolf D Berhane
*Assistant Examiner* — Nusrat Quddus
(74) *Attorney, Agent, or Firm* — CKC & Partners Co., LLC

(57) ABSTRACT

A power converter includes a power converting circuit, a high-voltage control circuit, a low-voltage control circuit, and a driving circuit. The power converting circuit is configured to receive and convert a HVDC voltage from a high-voltage side to a LVDC voltage to a low-voltage side. The high-voltage control circuit is coupled to the high-voltage side and configured to detect the HVDC voltage and output a first control signal according to the HVDC voltage. The low-voltage control circuit is coupled to the low-voltage side and configured to detect the LVDC voltage and output a second control signal according to the LVDC voltage. The driving voltage is configured to selectively output a driving signal to drive the power converting circuit according to the first or the second control signal.

19 Claims, 9 Drawing Sheets

(56) References Cited

U.S. PATENT DOCUMENTS

| | | | | |
|---|---|---|---|---|
| 7,265,524 B2* | 9/2007 | Jordan | ................. | H02M 3/158 |
| | | | | 323/225 |
| 8,018,212 B1* | 9/2011 | Petricek | .............. | H02M 3/1582 |
| | | | | 323/259 |
| 8,179,113 B2* | 5/2012 | Singnurkar | ......... | H02M 3/1582 |
| | | | | 323/282 |
| 8,258,765 B2* | 9/2012 | Nishida | ............... | H02M 3/1588 |
| | | | | 323/277 |
| 8,269,472 B2* | 9/2012 | Lin | .................... | H02M 3/1582 |
| | | | | 323/282 |
| 8,723,490 B2 | 5/2014 | Moussaoui et al. | | |
| 9,312,773 B2* | 4/2016 | Li | ....................... | H02M 3/1588 |
| 9,425,689 B2* | 8/2016 | Li | ........................ | H02M 3/156 |
| 9,490,704 B2* | 11/2016 | Jang | ...................... | H02M 3/285 |
| 9,673,704 B2* | 6/2017 | Franchini | ................ | B60T 8/885 |
| 2016/0380455 A1* | 12/2016 | Greening | ............. | H02J 7/0044 |
| | | | | 320/114 |

* cited by examiner

POWER CONVERTER, POWER CONVERTING SYSTEM, AND POWER CONVERTER CONTROL METHOD

CROSS-REFERENCE TO RELATED APPLICATION

This application claims priority to U.S. Provisional Application Ser. No. 62/567,593, filed Oct. 3, 2017, and priority to China Application Serial Number 201810642039.1, filed Jun. 21, 2018, which is herein incorporated by reference in its entirety.

BACKGROUND

Technical Field

The present disclosure relates to a power converting system. More particularly, it relates to a vehicle power converting system.

Description of Related Art

Recently, with the popularization of environmental awareness, the development of electric vehicles (EVs) or Hybrid Electric Vehicles (HEVs), which use electric energy as a power source, gradually replace the traditional vehicles, which use fossil fuels as a power source, as an important target in the vehicle field.

However, when the generator and the load in the vehicle power system are unbalanced between supply and demand, the overvoltage or undervoltage protection mechanism is activated due to the unstable voltage, which causes the power system to stop working, resulting in the system reliability is degraded or the vehicle is unable to drive.

SUMMARY

One aspect of the present disclosure is a power converter. The power converter includes a high-voltage side and a low-voltage side, a power converting circuit, a high-voltage control circuit, a low-voltage control circuit and a driving circuit. The high-voltage side is configured to electrically couple with a High Voltage Direct Current source output. The low-voltage side is configured to electrically couple with a Low Voltage Direct Current load. The power converting circuit is configured to receive a High Voltage Direct Current voltage from the high-voltage side and convert the High Voltage Direct Current voltage to a Low Voltage Direct Current voltage to the low-voltage side. The high-voltage control circuit is electrically coupled to the high-voltage side to detect the High Voltage Direct Current voltage and output a first control signal according to the High Voltage Direct Current voltage. The low-voltage control circuit is electrically coupled to the low-voltage side to detect the Low Voltage Direct Current voltage and output a second control signal according to the Low Voltage Direct Current voltage. The driving circuit is configured to selectively output a driving signal to drive the power converting circuit according to the first control signal or the second control signal.

In some embodiments, the high-voltage control circuit is further configured to receive a high-voltage command from a processing circuit and output the first control signal to the driving circuit according to the high-voltage command, so that the driving circuit controls the High Voltage Direct Current voltage to be regulated at a corresponding target voltage value.

In some embodiments, the high-voltage control circuit includes a first voltage divider circuit, a first compensation circuit and a first comparison amplifier. The first voltage divider circuit is configured to divide the High Voltage Direct Current voltage and output a first voltage detecting signal. The first compensation circuit is electrically coupled between the first voltage divider circuit and the driving circuit. The first compensation circuit is configured to receive the first voltage detecting signal. A first end of the first comparison amplifier is configured to receive the high-voltage command. A second end of the first comparison amplifier is electrically coupled to the first compensation circuit. An output end of the first comparison amplifier is electrically coupled to the driving circuit. The output end of the first comparison amplifier is configured to output the first control signal to the driving circuit.

In some embodiments, the low-voltage control circuit is further configured to receive a low-voltage command from a processing circuit and output the second control signal to the driving circuit according to the low-voltage command. The second control signal instructs the driving circuit to control the Low Voltage Direct Current voltage to be regulated at a corresponding target voltage value.

In some embodiments, the low-voltage control circuit includes a second voltage divider circuit, a second compensation circuit and a second comparison amplifier. The second voltage divider circuit is configured to divide the Low Voltage Direct Current voltage and output a second voltage detecting signal. The second compensation circuit is electrically coupled between the second voltage divider circuit and the driving circuit. The second compensation circuit is configured to receive the second voltage detecting signal. A first end of the second comparison amplifier is configured to receive the low-voltage command. A second end of the second comparison amplifier is electrically coupled to the second compensation circuit. An output end of the second comparison amplifier is electrically coupled to the driving circuit. The output end of the second comparison amplifier is configured to output the second control signal to the driving circuit.

In some embodiments, the power converter further includes an output current control circuit. The output current control circuit is electrically coupled to the low-voltage side to detect an output current of the power converting circuit. The output current control circuit is configured to receive an output current command from a processing circuit and output a third control signal to the driving circuit according to the output current and the output current command. The driving circuit is further configured to selectively output the driving signal to drive the power converting circuit according to the first control signal, the second control signal or the third control signal.

In some embodiments, the output current control circuit includes a current detection circuit, a third compensation circuit and a third comparison amplifier. The current detection circuit is configured to output an output current detection signal according to the output current. The third compensation circuit is electrically coupled between the current detection circuit and the driving circuit. The third compensation circuit is configured to receive the output current detection signal. A first end of the third comparison amplifier is configured to receive the output current command. A second end of the third comparison amplifier is electrically coupled to the third compensation circuit. An output end of the third comparison amplifier is electrically is coupled to the driving circuit. The output end of the third comparison amplifier is configured to output the third control signal to the driving circuit.

Another aspect of the present disclosure is a power converting system. The power converting system includes a direct current generator (dc generator), a power converting circuit, a high-voltage control circuit, a low-voltage control circuit, a processing circuit and a driving circuit. The dc generator is configured to output a High Voltage Direct Current voltage. The power converting circuit includes a high-voltage side and a low-voltage side. The high-voltage side is electrically coupled to the dc generator. The low-voltage side electrically coupled to a load. The power converting circuit is configured to convert the High Voltage Direct Current voltage to a Low Voltage Direct Current voltage to the low-voltage side. The high-voltage control circuit is electrically coupled to the high-voltage side to detect the High Voltage Direct Current voltage and output a first control signal. The low-voltage control circuit is electrically coupled to the low-voltage side to detect the Low Voltage Direct Current voltage and output a second control signal. The processing circuit is configured to output a high-voltage command to the high-voltage control circuit and control an activation of the high-voltage control circuit. The processing circuit is further configured to output a low-voltage command to the low-voltage control circuit and control an activation of the low-voltage control circuit. The driving circuit is configured to selectively output a driving signal to drive the power converting circuit according to the first control signal or the second control signal.

In some embodiments, the high-voltage control circuit includes a first voltage divider circuit, a first compensation circuit and a first comparison amplifier. The first voltage divider circuit is configured to divide the High Voltage Direct Current voltage and output a first voltage detecting signal corresponding to a divided High Voltage Direct Current voltage. The first compensation circuit is electrically coupled between the first voltage divider circuit and the driving circuit. The first compensation circuit is configured to receive the first voltage detecting signal. A first end of the first comparison amplifier is configured to receive the high-voltage command. A second end of the first comparison amplifier is electrically coupled to the first compensation circuit. An output end of the first comparison amplifier is electrically coupled to the driving circuit. The output end of the first comparison amplifier is configured to output the first control signal to the driving circuit.

In some embodiments, the low-voltage control circuit includes a second voltage divider circuit, a second compensation circuit and a second comparison amplifier. The second voltage divider circuit is configured to divide the Low Voltage Direct Current voltage and output a second voltage detecting signal corresponding to a divided Low Voltage Direct Current voltage. The second compensation circuit is electrically coupled between the second voltage divider circuit and the driving circuit. The second compensation circuit is configured to receive the second voltage detecting signal. A first end of the second comparison amplifier is configured to receive the low-voltage command. A second end of the second comparison amplifier is electrically coupled to the second compensation circuit. An output end of the second comparison amplifier is electrically coupled to the driving circuit. The output end of the second comparison amplifier is configured to output the second control signal to the driving circuit.

In some embodiments, the power converting system further includes a high-voltage side energy storage device. The high-voltage side energy storage device is electrically coupled to the dc generator and the high-voltage side of the power converting circuit. When the high-voltage side energy storage device is decoupled from the dc generator or is in an abnormal state, the processing circuit outputs the high-voltage command to control the high-voltage control circuit to activate and output the first control signal to the driving circuit, so that the driving circuit controls the High Voltage Direct Current voltage to be regulated at a corresponding target voltage value.

In some embodiments, when the high-voltage side energy storage device is decoupled from the dc generator or is in the abnormal state, the processing circuit further outputs the low-voltage command to control the low-voltage control circuit to be deactivated.

In some embodiments, the power converting system further includes an output current control circuit. The output current control circuit is electrically coupled to the low-voltage side to detect an output current of the power converting circuit and output a third control signal according to the output current. The processing circuit is configured to output an output current command to control whether the output current control circuit is activated, and the driving circuit is further configured to selectively output the driving signal according to the first control signal, the second control signal or the third control signal.

In some embodiments, when the high-voltage side energy storage device is operating normally, the processing circuit is configured to output the corresponding high-voltage command, the low-voltage command and the output current command so as to control one of the low-voltage control circuit or the output current control circuit to be activated.

In some embodiments, when the high-voltage side energy storage device is operating normally, the processing circuit outputs all of the high-voltage command, the low-voltage command and the output current command, and activates one of the low-voltage control circuit or the output current control circuit.

When the low-voltage control circuit is activated, the low-voltage control circuit is configured to output the second control signal to the driving circuit according to the low-voltage command, so that the driving circuit controls the Low Voltage Direct Current voltage to be regulated at a corresponding target voltage value, and the output current control circuit is deactivated according to the corresponding the output current command.

In some embodiments, when the output current control circuit is activated, the output current control circuit outputs a third control command to the driving circuit according to the output current command. The driving circuit controls the output current to be regulated at a corresponding target voltage value. The low-voltage control circuit is deactivated according to the corresponding low-voltage command.

In some embodiments, when the high-voltage side energy storage device is operating normally, the high-voltage control circuit is deactivated according to the corresponding high-voltage command.

In some embodiments, the output current control circuit includes a current detection circuit, a third compensation circuit and a third comparison amplifier. The current detection circuit is configured to output an output current detection signal according to the output current of the power converting circuit. The third compensation circuit is electrically coupled between the current detection circuit and the driving circuit. The third compensation circuit is configured to receive the output current detection signal. A first end of the third comparison amplifier is configured to receive the output current command. A second end of the third comparison amplifier is electrically coupled to the third compensation circuit. An output end of the third comparison amplifier is electrically coupled to the driving circuit. The output end of the third comparison amplifier is configured to output the third control signal to the driving circuit.

Another aspect of the present disclosure is a power converter control method, includes the following steps. Providing a power converting circuit having a high-voltage side for coupling with High Voltage Direct Current source output, and a low-voltage side for coupling with a Low Voltage Direct Current load. Providing a high-voltage control circuit electrically coupled to the high-voltage side. Providing a low-voltage control circuit electrically coupled to the low-voltage side. Converting, by the power converting circuit, a High Voltage Direct Current voltage from the high-voltage side to a Low Voltage Direct Current voltage and outputting the Low Voltage Direct Current voltage to the low-voltage side. Selectively activating, by a processing circuit, the high-voltage control circuit or the low-voltage control circuit. If the high-voltage control circuit is activated, the method further includes the following steps: (i-1) detecting, by the high-voltage control circuit, the High Voltage Direct Current voltage, and outputting a first control signal; and (i-2) outputting a driving signal according to the first control signal, by a driving circuit, to drive the power converting circuit and control the High Voltage Direct Current voltage corresponding to the first control signal. If the low-voltage control circuit is activated, the method further includes the following steps: (ii-1) detecting, by the low-voltage control circuit, the Low Voltage Direct Current voltage, and outputting a second control signal; and (ii-2) outputting a driving signal according to the second control signal, by a driving circuit, to drive the power converting circuit and control the Low Voltage Direct Current voltage corresponding to the second control signal.

In some embodiments, the power converter control method further includes the following steps. Providing a high-voltage side energy storage device coupled to the high-voltage side. Detecting the high-voltage side energy storage device being decoupled or is in an abnormal state. Outputting a high-voltage command, by the processing circuit, to activate the high-voltage control circuit. Outputting, by the high-voltage control circuit, the first control signal to the driving circuit according to the high-voltage command. Stabilizing, by the driving circuit, the High Voltage Direct Current voltage towards a corresponding target voltage value according to the first control signal.

It is to be understood that both the foregoing general description and the following detailed description are by examples, and are intended to provide further explanation of the disclosure as claimed.

BRIEF DESCRIPTION OF THE DRAWINGS

The present disclosure can be more fully understood by reading the following detailed description of the embodiment, with reference made to the accompanying drawings as follows.

DETAILED DESCRIPTION

Although embodiments are described in detail with the accompanying drawings, they are not intended to limit the scope of the present disclosure. Moreover, the operation of the described structure does not limit the order of implementation. Any device with equivalent functions configured by a different combinations of disclosed elements is intended to be covered by the scope of the present disclosure. Drawings are for the purpose of illustration only, and not plotted in accordance with the original size.

It will be understood that when an element is referred to as being "connected to" or "coupled to", it can be directly connected or coupled to the other element or intervening elements may be present. In contrast, when an element to another element is referred to as being "directly connected" or "directly coupled," there are no intervening elements present. As used herein, the term "and/or" includes an associated listed items or any and all combinations of more.

Figure 1:
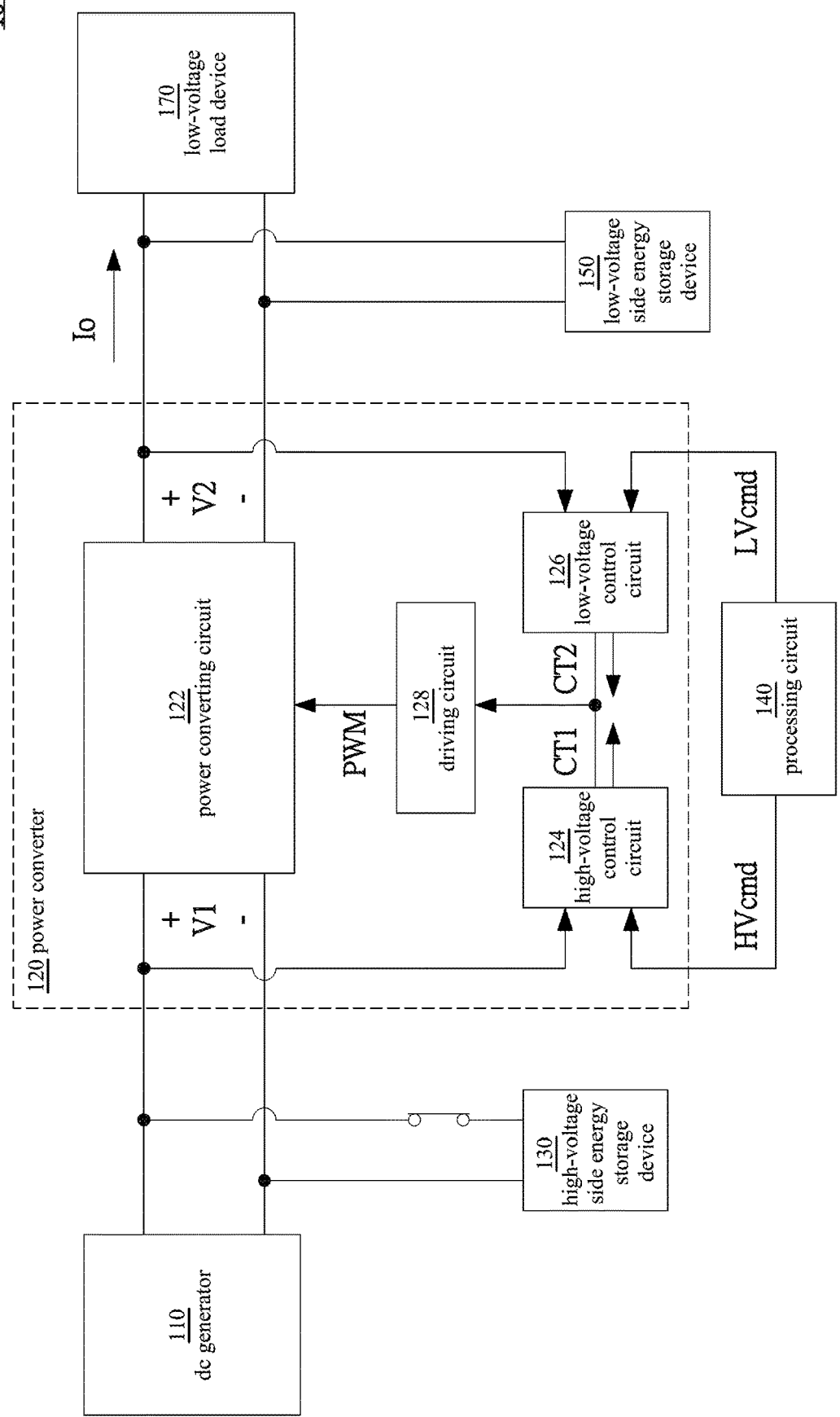
FIG. 1 is a schematic diagram of a power converting system according to an embodiment of the present disclosure.

Referring to FIG. 1, in some embodiments, the power converting system 100 includes a dc generator 110, a power converter 120, a high-voltage side energy storage device 130, a processing circuit 140, a low-voltage side energy storage device 150, and a low-voltage load device 170. In some embodiments, the power converting system 100 can be used in an electric vehicle (EV) or a Hybrid Electric Vehicle (HEV) system. Through the cooperation of power converter 120 and processing circuit 140, converting a High Voltage Direct Current (HVDC) voltage V1 output by the dc generator 110 of a high-voltage side to a Low Voltage Direct Current (LVDC) voltage V2, and providing an output current Io to the low-voltage side energy storage device 150 and the low-voltage load device 170 of a low-voltage side. Accordingly, the power required for a load (e.g., various devices in the vehicle system) can be provided.

For example, in some embodiments, the HVDC voltage V1 output by the dc generator 110 is approximately 48 volts. The power converter 120 converts the HVDC voltage V1 to the LVDC voltage V2 (e.g., about 12V) to supply power requirements such as an audio system on the vehicle or a on-board electronic device such as driving recorder. It is worth noting that the above values and applications are for illustrative purposes only and are not intended to limit the present disclosure.

As shown in FIG. 1, the power converter 120 includes a high-voltage side, a low-voltage side, a power converting circuit 122, a high-voltage control circuit 124, a low-voltage control circuit 126 and a driving circuit 128. The high-voltage side of the power converting circuit 122 (e.g., HVDC voltage V1 output) is electrically coupled the dc generator 110. The low-voltage side of the power converting circuit 122 (e.g., LVDC voltage V2 output) is coupled to the low-voltage side energy storage device 150 and the low-voltage load device 170. The power converting circuit 122 is configured to convert the HVDC voltage V1 to the LVDC voltage V2 to output to the low-voltage side of the power converting circuit 122.

In some embodiments, the high-voltage control circuit 124 is electrically coupled to the high-voltage side to detect the HVDC voltage V1 and correspondingly output a first control signal CT1. The low-voltage control circuit 126 is electrically coupled to the low-voltage side to detect the LVDC voltage V2 and correspondingly output a second control signal CT2.

The driving circuit 128 is electrically coupled to the high-voltage control circuit 124 and the low-voltage control circuit 126 so as to selectively output a driving signal PWM to drive the power converting circuit 122 according to the first control signal CT1 or the second control signal CT2.

Specifically, the power converting circuit 122 is implemented by various switching DC-DC conversion circuits. For example, the power converting circuit 122 can be implemented by a circuit such as a Buck Converter or a Buck-Boost Converter. The driving circuit 128 can output a driving signal PWM to control the switch of the power converting circuit 122 to turn on and turn off in a pulse width modulation manner. Accordingly, by adjusting the duty cycle of the driving signal PWM, the length of time when the switch of the power converting circuit 122 is activated in the complete period can be controlled, thereby controlling the operation of the power converter 120.

In some embodiments, at the same time, only one of the high-voltage control circuit 124 or the low-voltage control circuit 126 will be activated. In other words, when the high-voltage control circuit 124 is activated to output the first control signal CT1, the low-voltage control circuit 126 is deactivated. On the other hand, when the low-voltage control circuit 126 is activated to output the second control signal CT2, the high-voltage control circuit 124 is deactivated.

It should be noted that in some other embodiments, the driving circuit 128 may also selectively receive the first control signal CT1 or the second control signal CT2 by other means. In the embodiment shown in FIG. 1, the high-voltage control circuit 124 and the low-voltage control circuit 126 are coupled to the driving circuit 128 at the same node, but in some other embodiments, the power converter 120 may also be provided with a switch for selectively outputting the first control signal CT1 or the second control signal CT2 to the driving circuit 128 using the switch. In some other embodiments, the driving circuit 128 can also receive the first control signal CT1 and the second control signal CT2 through separate connections of high-voltage control circuit 124 and low-voltage control circuit 126 to the driving circuit 128, and determine (e.g., according to the first control signal CT1 or the second control signal CT2) the adjustment of the duty cycle of the driving signal PWM through an internal circuit of the driving circuit 128. Therefore, FIG. 1 is only one possible implementation of the present disclosure, and is not intended to limit the present disclosure.

As shown in FIG. 1, the power converting system 100 can control, through the processing circuit 140, whether the high-voltage control circuit 124 and the low-voltage control circuit 126 are activated and deactivated. The power converting system 100 controls the voltage level of the HVDC voltage V1 or the voltage level of the LVDC voltage V2 according to the corresponding command value.

Specifically, the processing circuit 140 is electrically connected to the high-voltage control circuit 124 and the low-voltage control circuit 126. The processing circuit 140 is configured to output a high-voltage command HVcmd to the high-voltage control circuit 124 and control an activation of the high-voltage control circuit 124. The processing circuit 140 is further configured to output a low-voltage command LVcmd to the low-voltage control circuit 126 and control an activation of the low-voltage control circuit 126.

As shown in FIG. 1, the high-voltage side and low-voltage side of the power converter 120 can be coupled to the high-voltage side energy storage device 130 and the low-voltage side energy storage device 150, respectively, to perform necessary power compensation. In some embodiments, each of the high-voltage side energy storage device 130 and the low-voltage side energy storage device 150 may be implemented by an energy storage battery. For example, the low-voltage side energy storage device 150 is electrically coupled to the low-voltage load device 170 and the low-voltage side of power converting circuit 122. When the low-voltage load device 170 is under light load, the low-voltage side energy storage device 150 can receive additional power output by the power converter 120. When the low-voltage load device 170 is under heavy load or the power converter 120 is unable to sufficiently supply the power required by the low-voltage load device 170, the low-voltage side energy storage device 150 can output the stored power to the low-voltage load device 170 to maintain the supply and demand balance on the power system.

Similarly, the high-voltage side energy storage device 130 is electrically coupled to the dc generator 110 and the high-voltage side of the power converting circuit 122. The high-voltage side energy storage device 130 can also adjust the power output by the dc generator 110 to the power converter 120 to maintain the stability of the HVDC voltage V1 on the high-voltage side.

However, if the high-voltage side energy storage device 130 is decoupled from the dc generator 110 or is in an abnormal state, the high-voltage side energy storage device 130 cannot adjust the HVDC voltage V1 on the high-voltage side. For example, in extremely low temperature environments. High voltage batteries may not work due to the low temperatures. Under this condition, if the load end of the low-voltage side experiences changing conditions drastically, the response of the dc generator 110 is slow, and the output power of the generator is insufficiently adjusted in time. This could lead to the HVDC voltage V1 on the high-voltage side to experience overvoltage, undervoltage or overcurrent on the high-voltage side, so that the protection circuit acts accordingly, and further causes the system to operate abnormally, such as the power system stops working.

In order to avoid the above situation, in some embodiments of the present disclosure, if the high-voltage side energy storage device 130 is decoupled from the dc generator 110 or is in an abnormal state, the processing circuit 140 outputs a corresponding high-voltage command HVcmd to activate and control the high-voltage control circuit 124 to output the first control signal CT1 to the driving circuit 128 according to the high-voltage command HVcmd, so that the driving circuit 128 controls the HVDC voltage V1 to be regulated at a corresponding target voltage value. Accordingly, by a mechanism of regulating the voltage, it will avoid a situation that the overvoltage or overcurrent protection mechanism is activated.

Figure 2A:
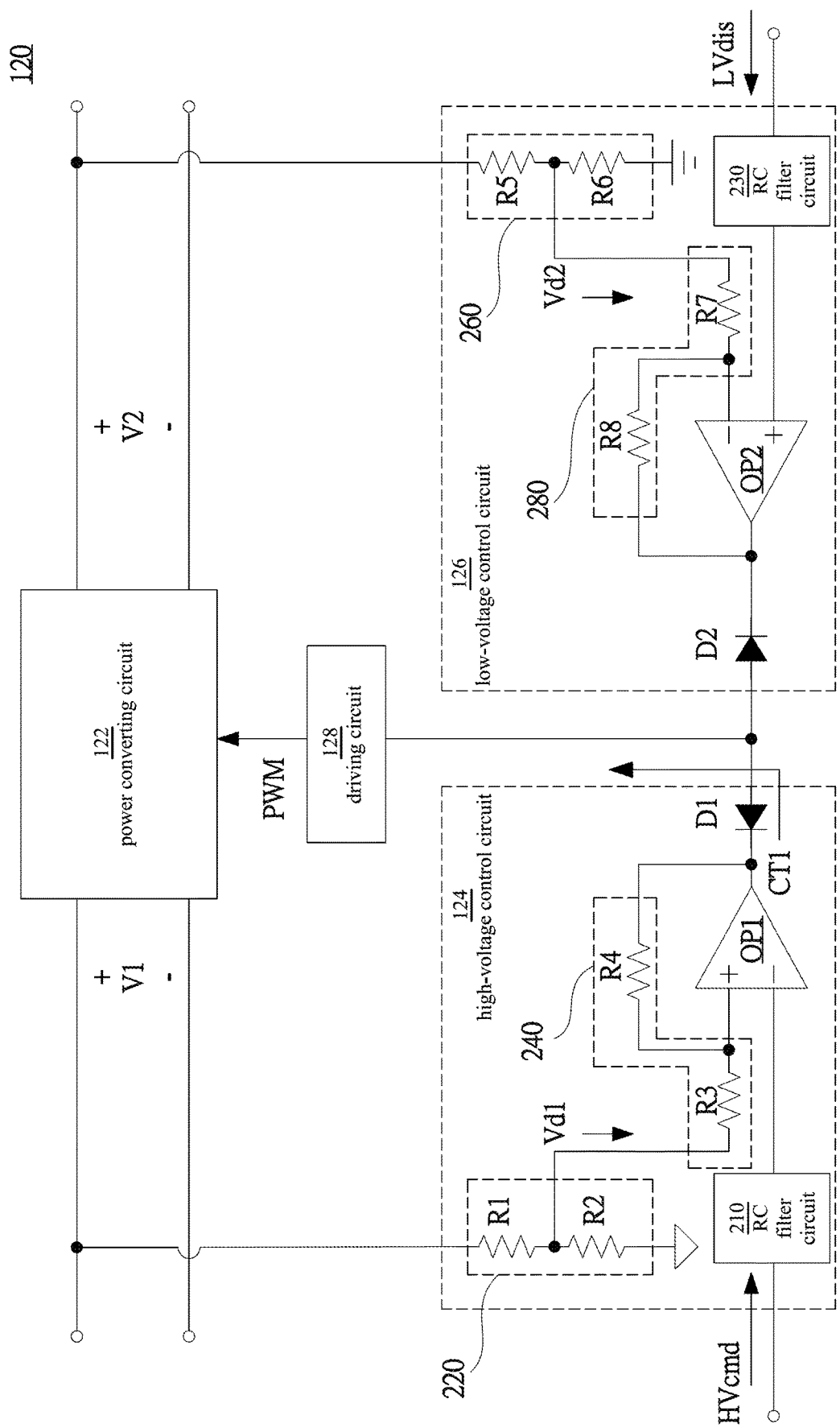
FIGS. 2A and 2B are operation schematic diagrams of a power converter according to embodiments of the present disclosure.
Figure 2B:
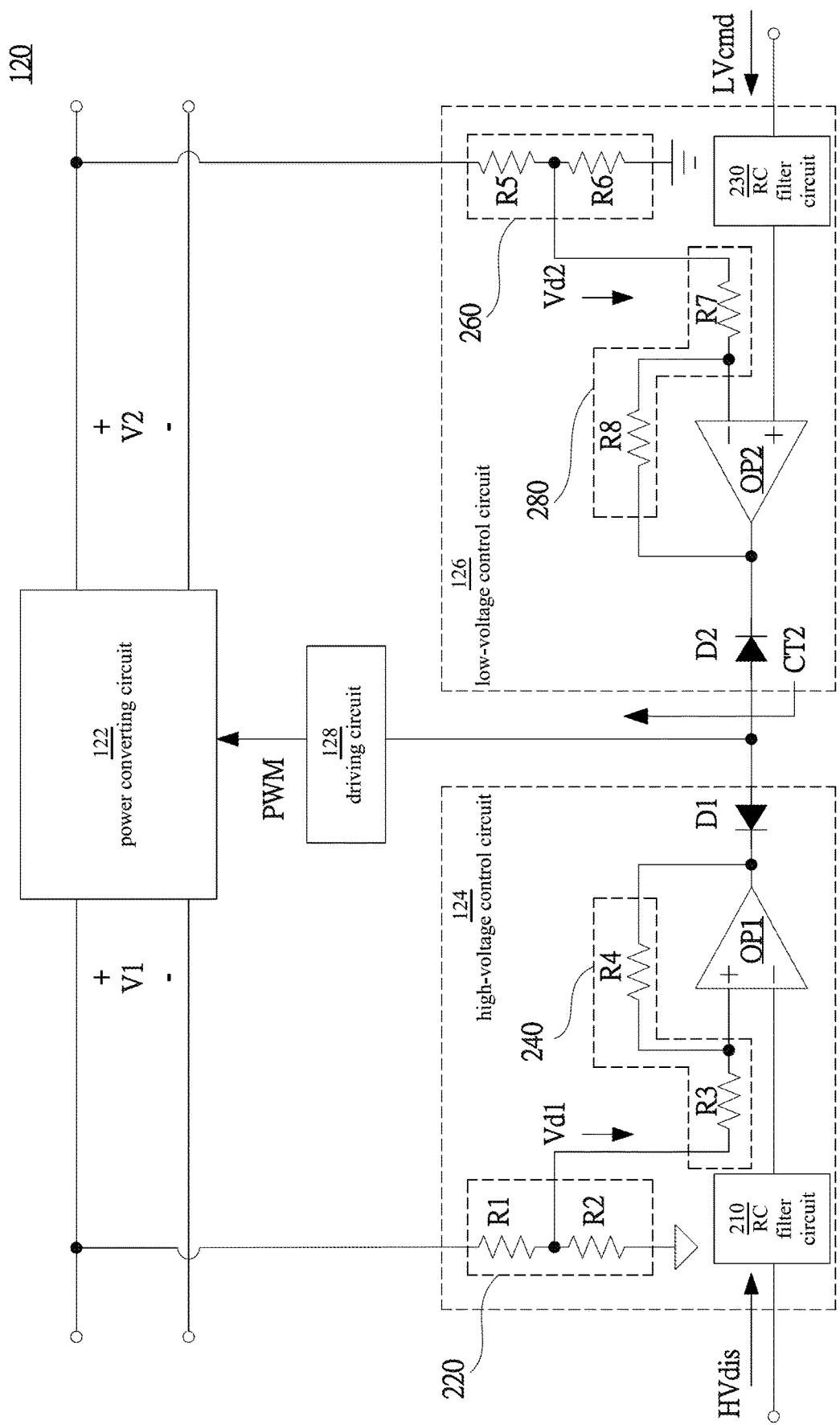

For convenience of explanation, the cooperative operation of the power converter 120 and the processing circuit 140 will be described with reference to FIGS. 2A and 2B. Please refer to FIGS. 2A and 2B. FIGS. 2A and 2B are operation schematic diagrams of a power converter in some embodiments of the present disclosure.

As shown in FIGS. 2A and 2B, in some embodiments, the high-voltage control circuit 124 includes a voltage divider circuit 220, a compensation circuit 240, a comparison amplifier OP1, and a rectifying element D1. The voltage divider circuit 220 is electrically coupled to the high-voltage side to divide the HVDC voltage V1 to output a voltage detection signal Vd1 corresponding to a divided HVDC voltage V1.

For example, the voltage divider circuit 220 may include voltage dividing resistors R1, R2 connected in series with each other. By selecting the appropriate resistance of the divider resister R1 and R2, the voltage divider circuit 220 can divide and output a voltage detection signal Vd1 having an appropriate voltage range for operation of the back-end circuit.

In some embodiments, the compensation circuit 240 is electrically coupled between the voltage divider circuit 220 and the driving circuit 128 to receive the voltage detection signal Vd1. The first end (e.g., the negative terminal) of the comparison amplifier OP1 is electrically coupled to the processing circuit 140 to receive the high-voltage command HVcmd. The second end (e.g., the positive terminal) of the comparison amplifier OP1 is electrically coupled to the compensation circuit 240. The output end of the comparison amplifier OP1 is electrically coupled to the driving circuit 128 through the rectifying element D1 to output the first control signal CT1.

In some embodiments, the rectifying element D1 can be implemented by a diode unit. As shown in FIG. 2A and FIG. 2B, the positive end of the rectifier element D1 is coupled to the driving circuit 128, and the negative end of the rectifier element D1 is coupled to the output end of the comparison amplifier OP1.

As shown in the figure, the compensation circuit 240 may include the resistor R3 and the resistor R4, but the present disclosure is not limited thereto. In other embodiments, the compensation circuit 240 can include resistors and capacitors that are electrically connected in various forms to form an RC circuit. In the embodiment shown in FIG. 2A and FIG. 2B, one end of the resistor R3 is electrically coupled to the voltage divider circuit 220, and the other end is electrically coupled to the second end of the comparison amplifier OP1 (e.g., the positive terminal). One end of the resistor R4 is electrically coupled to the second end of the comparison amplifier OP1 (e.g., the positive terminal), and the other end is electrically coupled to the output end of the comparison amplifier OP1.

Similarly, in some embodiments, the low-voltage control circuit 126 may also include a corresponding voltage divider circuit 260, a compensation circuit 280, and a comparison amplifier OP2. The voltage divider circuit 260 is electrically coupled to the low-voltage side for dividing the LVDC voltage V2 to output a voltage detection signal Vd2 corresponding to a divided LVDC voltage V2. For example, the voltage divider circuit 260 can include divider resisters R5 and R6 in series with one another. By selecting the appropriate resistance of divider resisters R5 and R6, the voltage divider circuit 260 can divide the voltage and output a voltage detection signal Vd2 with an appropriate voltage range for operation of the back-end circuit.

In some embodiments, the compensation circuit 280 is electrically coupled between the voltage divider circuit 260 and the driving circuit 128 for receiving the voltage detection signal Vd2. The first end (e.g., the positive end) of the comparison amplifier OP2 is electrically coupled to the processing circuit 140 for receiving the low-voltage command LVcmd. The second end (e.g., the negative end) of the comparison amplifier OP2 is electrically coupled to the compensation circuit 280. The output end of the comparison amplifier OP2 is electrically coupled to the driving circuit 128 through the rectifying element D2 for outputting the second control signal CT2.

In some embodiments, the rectifying element D2 can be implemented by a diode unit. As shown in FIG. 2A and FIG. 2B, the positive end of the rectifier element D2 is coupled to the driving circuit 128, and the negative end of the rectifier element D2 is coupled to the output end of the comparison amplifier OP2.

As shown in the figure, the compensation circuit 280 can include the resistor R7 and the resistor R8, but the present disclosure is not limited thereto. Similar to the compensation circuit 240, in other embodiments, the compensation circuit 280 can also include resistors and capacitors that are electrically connected in various forms to form an RC circuit. In the embodiment shown in FIG. 2A and FIG. 2B, one end of the resistor R7 is electrically coupled to the voltage divider circuit 260, and the other end is electrically coupled to the second end (e.g., the negative terminal) of the comparison amplifier OP2. One end of the resistor R8 is electrically coupled to the second end (e.g., the negative terminal) of the comparison amplifier OP2, and the other end is electrically coupled to the output end of the comparison amplifier OP2.

As shown in FIG. 2A, in operation, if the high-voltage side energy storage device 130 is decoupled from the dc generator 110 or is in an abnormal state, the processing circuit 140 can output a corresponding high-voltage command HVcmd. At this time, the high-voltage control circuit 124 can receive the high-voltage command HVcmd from the processing circuit 140 to output the first control signal CT1 to the driving circuit 128 according to the high-voltage command HVcmd, so that the driving circuit 128 controls the HVDC voltage V1 to stabilize in the corresponding target voltage value.

Specifically, as shown in FIG. 2A, first the high-voltage command HVcmd can be filtered by the RC filter circuit 210. The filtered high-voltage command HVcmd is used as the reference voltage of the high-voltage control circuit 124 and is input to the negative end of the comparison amplifier OP1. In this way, the comparison amplifier OP1 can be combined with the compensation circuit 240 to output the control signal CT1 to the driving circuit 128 according to a voltage error signal of the positive end and the negative end.

For example, in some embodiments, the driving circuit can be an Integrated Circuit (IC), and the comparison amplifier OP1 is electrically coupled to a connection Vcomp of the driving circuit 128. When the HVDC voltage V1 is reduced due to the reduction of the back end load, the voltage detection signal Vd1 of the voltage division feedback is also increased accordingly. At this time, the voltage value of the connection Vcomp is correspondingly increased, so that the duty cycle of the driving signal PWM output by the driving circuit 128 is increased. As a result, the output power of the power converter 120 is increased to deliver energy to the low-voltage side energy storage device 150 of the back-end circuit, so that the HVDC voltage V1 is controlled without further increase to cause the overvoltage protection mechanism to activate.

Accordingly, the processing circuit 140 outputs a corresponding low-voltage command LVdis to control the low-voltage control circuit 126 to be deactivated. For example, at this time the low-voltage command LVdis can be set to a voltage command corresponding to the maximum output voltage. As a result, the circuit in the low-voltage control circuit 126 does not operate and affects the voltage value of the connection Vcomp.

On the other hand, as shown in FIG. 2B, in operation, when the high-voltage side energy storage device 130 is operating normally, the processing circuit 140 may output a corresponding low-voltage command LVcmd. At this time, the low-voltage control circuit 126 can receive the low-voltage command LVcmd from the processing circuit 140 to output the second control signal CT2 to the driving circuit

128 according to the low-voltage command LVcmd. The second control signal CT2 instructs the driving circuit 128 to control the LVDC voltage V2 to be regulated in the corresponding target voltage value.

Specifically, as shown in FIG. 2B, the low-voltage command LVcmd may be first filtered by the RC filter circuit 230. The filtered low-voltage command LVcmd is input as the reference voltage of the low-voltage control circuit 126 to the positive end of the comparison amplifier OP2. In this way, the comparison amplifier OP2 is combined with the compensation circuit 280 to output the control signal CT2 to the driving circuit 128 according to the voltage error signal of the positive end and the negative end.

For example, in some embodiments, the output end of the comparison amplifier OP2 is electrically coupled to the connection Vcomp of the driving circuit 128. When the LVDC voltage V2 is increased, the voltage detection signal Vd2 of the voltage division feedback is also increased accordingly. Since the feedback voltage detection signal Vd2 is output to the negative end of the comparison amplifier OP2, the voltage value of the connection Vcomp decreases accordingly, so that the duty cycle of the driving signal PWM output of the driving circuit 128 decreases. As a result, the LVDC voltage V2 decreases accordingly to control the LVDC voltage V2 at a voltage level corresponding to the low-voltage command LVcmd.

Accordingly, the processing circuit 140 outputs a high-voltage command HVdis to control the high-voltage control circuit 124 to be deactivated according to the corresponding high-voltage command HVdis. For example, the high-voltage command HVdis can be set to zero at this time. As a result, the circuit in the high-voltage control circuit 124 does not operate and affect the voltage value of the connection Vcomp.

In addition, as shown in the figure, since the rectifying elements D1 and D2 are respectively connected in opposition to the comparison amplifiers OP1 and OP2, the high-voltage control circuit 124 and the low-voltage control circuit 126 do not interfere with each other during operation and do not cause an abnormal operation. Specifically, when the high voltage is controlled, the high-voltage control circuit 124 can conduct current from the driving circuit 128 through a current path formed by the rectifying element D1, the voltage divider circuit 220 and the compensation circuit 240, to cooperate with the high-voltage command HVcmd to control the voltage value of the connection Vcomp.

Similarly, when the low voltage is controlled, the low-voltage control circuit 126 can conduct current from the driving circuit 128 through a current path formed by the rectifying element D2, the voltage divider circuit 260 and the compensation circuit 280, to cooperate with the low-voltage command LVcmd to control the voltage value of the connection Vcomp. Since the rectifying element D1 is connected in opposition to the rectifying element D2, the high-voltage control circuit 124 and the low-voltage control circuit 126 do not interfere with each other because of the current path. It is worth noting that, in some other embodiments, the high-voltage control circuit 124 and the low-voltage control circuit 126 are not connected to a common node, and the driving circuit 128 selects the control mode by other means. Accordingly, the output end of the comparison amplifiers OP1 and OP2 can be directly coupled to different connections of the switch or the driving circuit 128 without using the rectifying elements D1 and D2 to avoid signal interference. Therefore, the circuits shown in FIG. 2A and FIG. 2B are merely examples and are not intended to limit the present disclosure.

As described, the processing circuit 140 can output a high-voltage command and a low-voltage command respectively to control whether the high-voltage control circuit 124 and the low-voltage control circuit 126 are activated.

When the high-voltage control circuit 124 is activated, the power converter 120 detects the HVDC voltage V1 through the high-voltage control circuit 124 and outputs the first control signal CT1, so that the driving circuit 128 outputs the driving signal PWM according to the first control signal CT1 to drive the power converting Circuit 122, and controls HVDC voltage V1 corresponding to first control signal CT1. When the low-voltage control circuit 126 is activated, the power converter 120 detects the LVDC voltage V2 through the low-voltage control circuit 126 and outputs the second control signal CT2, so that the driving circuit 128 outputs the driving signal PWM according to the second control signal CT2 to drive the power converting Circuit 122 and controls LVDC voltage V2 corresponding to second control signal CT2.

Therefore, when the high-voltage side energy storage device 130 is decoupled from the dc generator 110 or is in an abnormal state, the HVDC voltage V1 can be regulated at a corresponding target voltage value, and the HVDC voltage V1 is prevented from exceeding the safe range to prevent the HVDC voltage V1 from malfunctioning due to exceeding the safe range.

Figure 3:
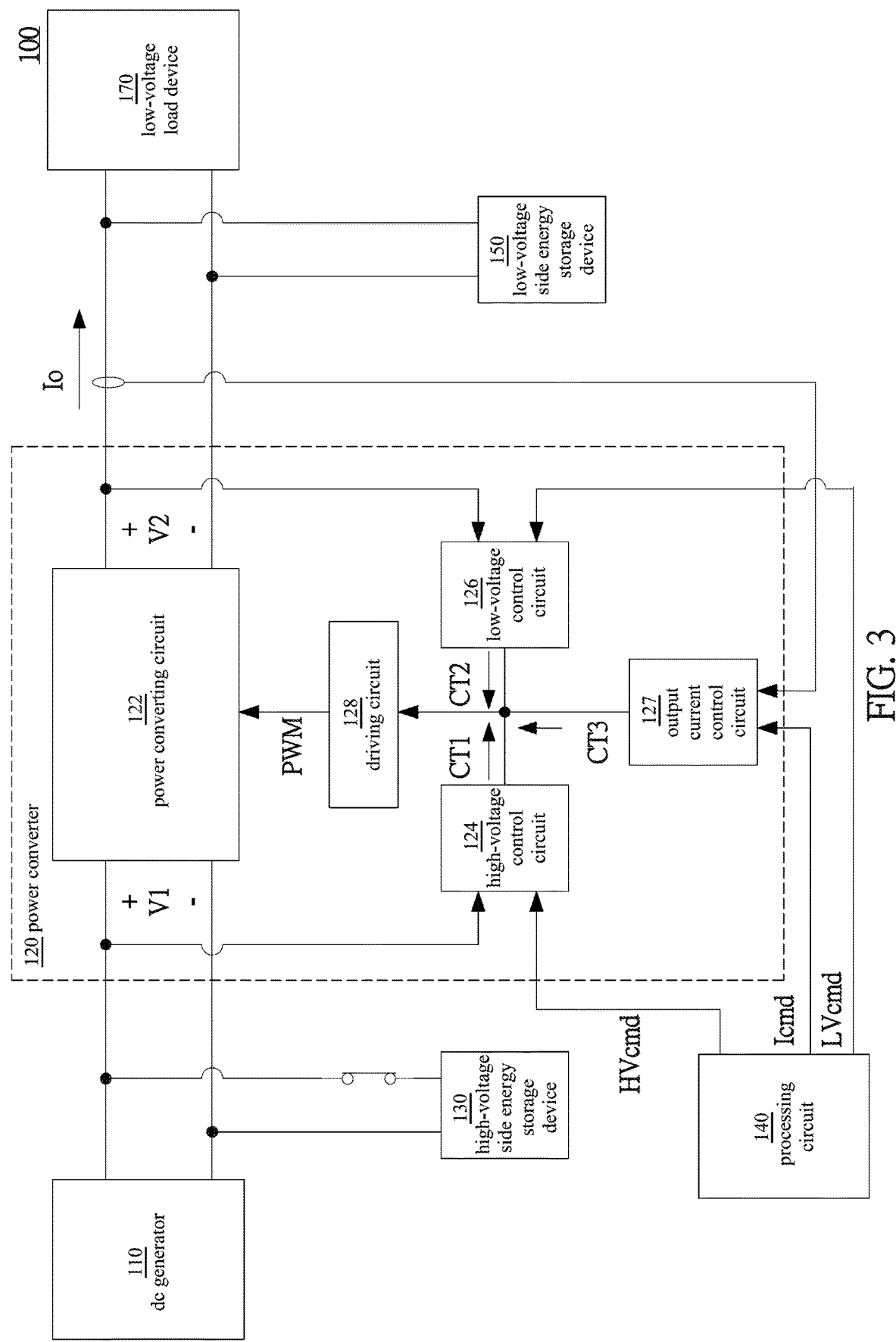
FIG. 3 is a schematic diagram of a power converting system according to an embodiment of the present disclosure.

Please refer to the FIG. 3. In FIG. 3, the similar components associated with the embodiment of FIG. 1 are labeled with the same number for ease of understanding. The specific principle of the similar component has been explained in detail in the previous paragraphs, and unless it has a cooperative relationship with the components of FIG. 3, it is not repeated here.

As shown in FIG. 3, compared to the embodiment of FIG. 1, in some embodiments, the power converter 120 can further include an output current control circuit 127. The output current control circuit 127 is electrically coupled to the low-voltage side for detecting the output current Io of the power converting circuit 122, and for outputting the third control signal CT3 according to the output current Io. In this embodiment, the driving circuit 128 is further configured to selectively output the driving signal PWM according to the first control signal CT1, the second control signal CT2, or the third control signal CT3.

Specifically, in this embodiment, the processing circuit 140 is further configured to output an output current command Icmd to control whether the output current control circuit 127 is activated. The power converter 120 can operate in any of the high voltage control mode, the low voltage control mode, or the output current control mode according to the control of the processing circuit 140 to perform corresponding control according to the current system state.

As described in the previous embodiment, if the high-voltage side energy storage device 130 is decoupled from the dc generator 110 or is in an abnormal state, the power converter 120 is operable in a high voltage control mode. On the other hand, when the high-voltage side energy storage device 130 is operating normally, the processing circuit 140 can control the power converter 120 to operate in the low voltage control mode or the output current control mode according to actual needs.

Figure 4A:
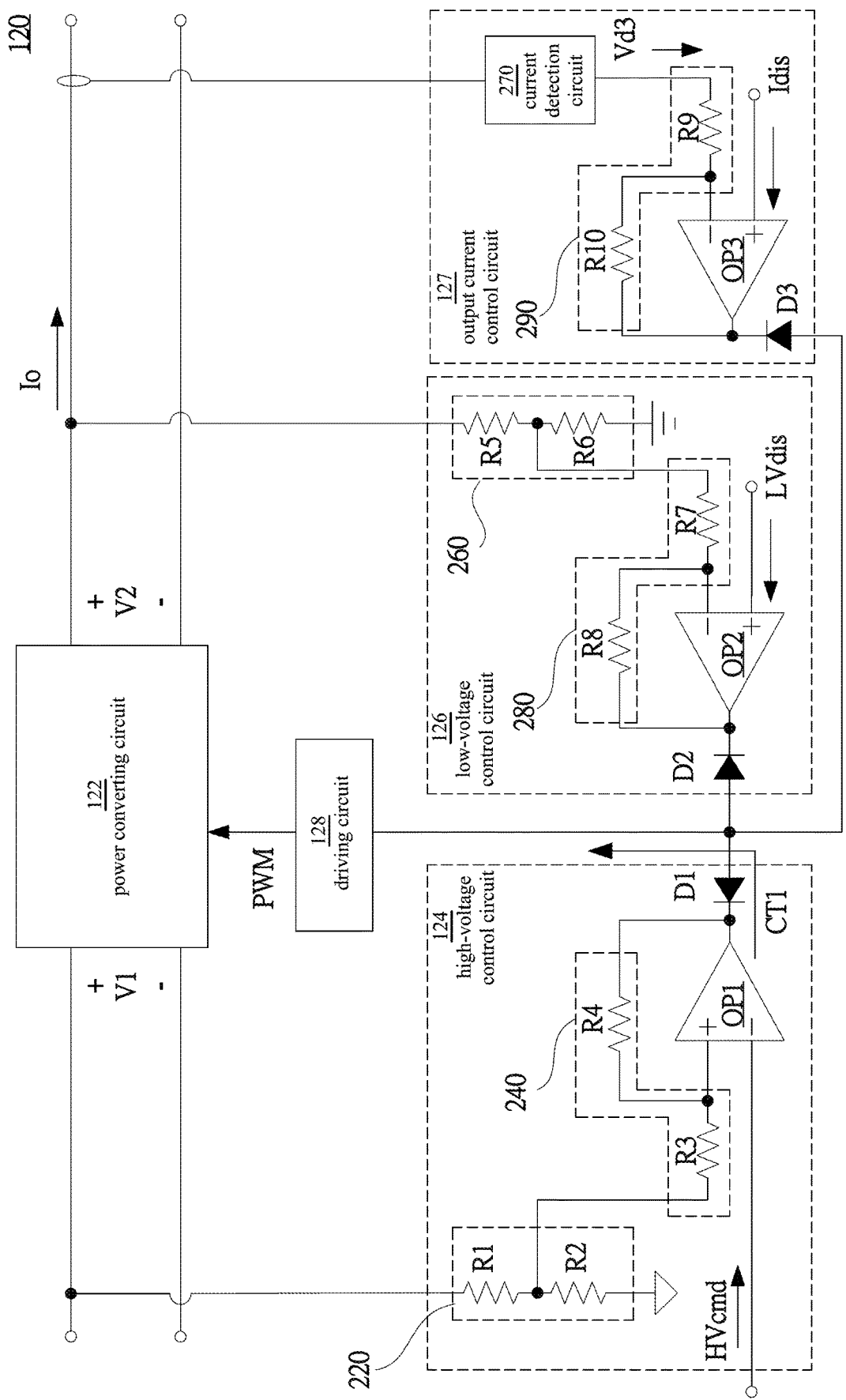
FIGS. 4A to 4C are operation schematic diagrams of a power converter according to embodiments of the present disclosure.
Figure 4B:
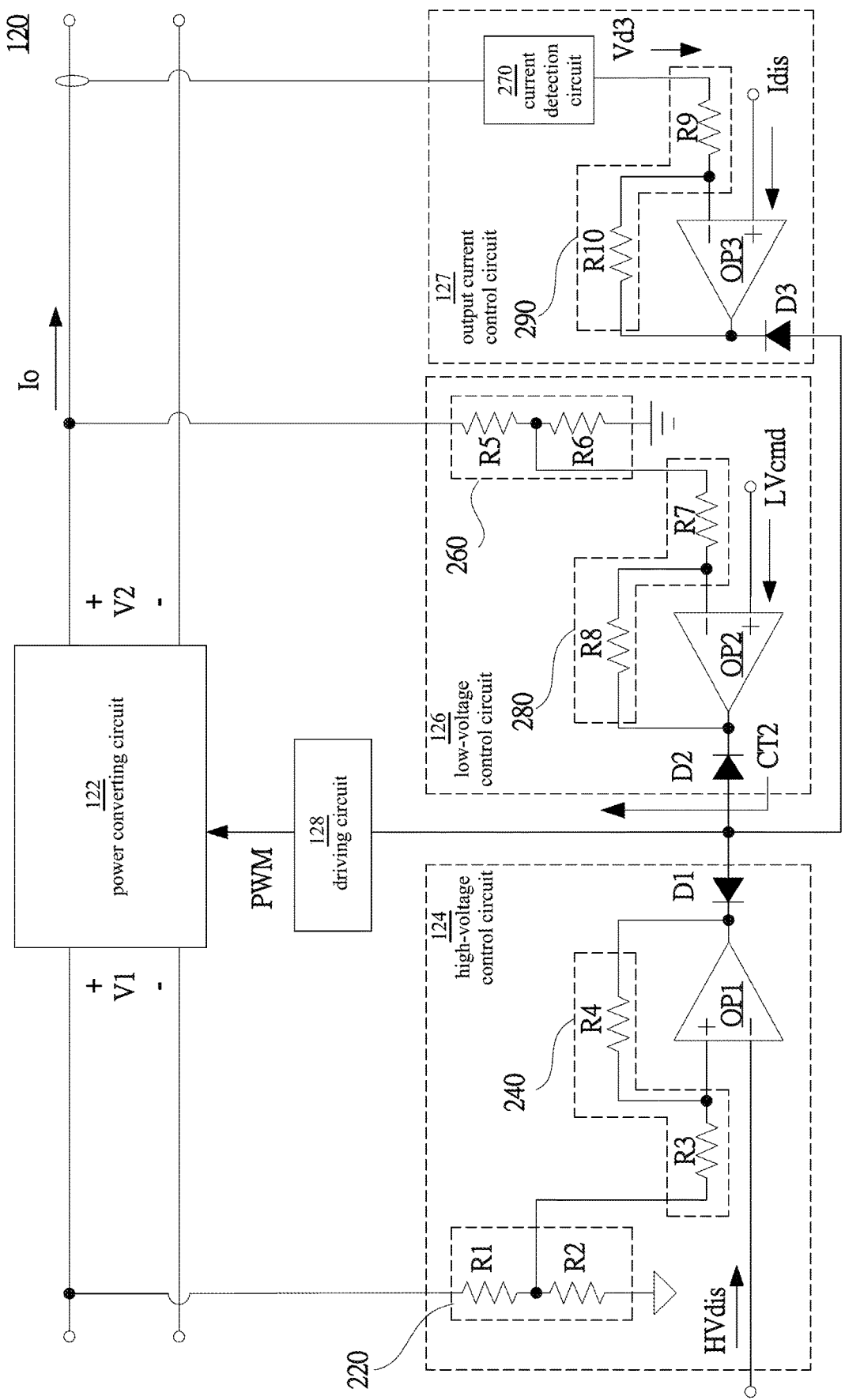
Figure 4C:
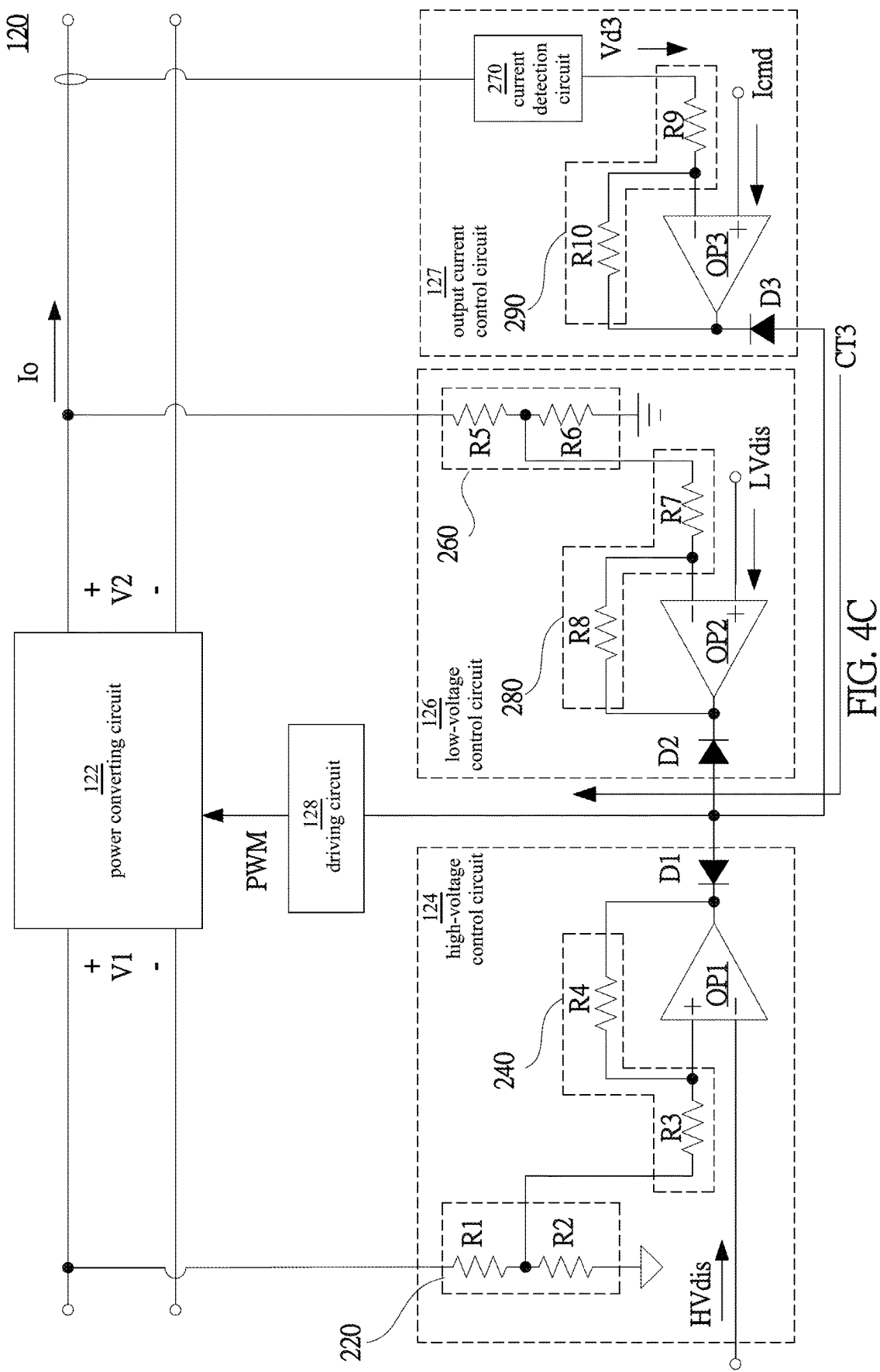

For convenience of explanation, the cooperative operation of the power converter 120 and the processing circuit 140 will be described with reference to FIG. 4A to FIG. 4C. Referring to Fig.4A to FIG. 4C, the similar components associated with the embodiment of FIG. 2A and FIG. 2B are labeled with the same number for ease of understanding. The specific principle of the similar component has been explained in detail in the previous paragraphs, and unless it has a cooperative relationship with the components of FIG. 4A to FIG. 4C, it will not be repeated here.

As shown in FIGS. 4A to 4C, in some embodiments, the output current control circuit 127 includes a current detection circuit 270, a compensation circuit 290, a comparison amplifier OP3, and a rectifying element D3. The current detection circuit 270 is electrically coupled to the low-voltage side for outputting an output current detection signal Vd3 according to the output current Io. For example, in some embodiments, current detection circuit 270 can be implemented by a current detecting resistor.

The compensation circuit 290 is electrically coupled between the current detection circuit 270 and the driving circuit 128 for receiving the output current detection signal Vd3. The first end of the OP3 is configured to receive the output current command Icmd. The second end of the OP3 is electrically coupled to the compensation circuit 290, and the output end of the comparison amplifier OP3 is electrically coupled to the driving circuit 128 through the rectifying element D3. As described in the previous embodiments, in some embodiments, the rectifying element D3 can be implemented by a diode unit. As shown in FIG. 4A to FIG. 4C, the positive end of the rectifier element D3 is coupled to the driving circuit 128, and the negative end of the rectifier element D3 is coupled to the output end the comparison amplifier OP3. In other words, the positive ends of the rectifying elements D1, D2, D3 are coupled to each other to ensure that the output current control circuit 127, the high-voltage control circuit 124 and the low-voltage control circuit 126 do not interfere with each other because of having a current path. Since the operation of the rectifying element D3 is similar to that of the rectifying elements D1, D2 in the previous embodiment, the details thereof are not further described herein.

As shown in the figure, the compensation circuit 290 can include the resistor R9 and the resistor R10, but the disclosure is not limited thereto. In other embodiments, the compensation circuit 290 can include resistors and capacitors that are electrically connected in various forms to form an RC circuit. One end of the resistor R9 is electrically coupled to the current detection circuit 270, and the other end is electrically coupled to the second end (e.g., the negative terminal) of the comparison amplifier OP3. One end of the resistor R10 is electrically coupled to the second end (e.g., the negative terminal) of the comparison amplifier OP3, and the other end is electrically coupled to the output end of the comparison amplifier OP3.

As shown in FIG. 4A, if the high-voltage side energy storage device 130 is decoupled from the dc generator 110 or is in an abnormal state, the power converter 120 can operate in the high voltage control mode. At this time, the processing circuit 140 outputs a high-voltage command HVcmd, so that the comparison amplifier OP1 can be combined with the compensation circuit 240 to output the control signals CT1 to the driving circuit 128 according to the voltage error signals of the positive end and the negative end.

Correspondingly, the processing circuit 140 outputs a corresponding low-voltage command LVdis and an output current command Idis to control the low-voltage control circuit 126 and the output current control circuit 127 to be deactivated. For example, the output current command Idis is similar to the low-voltage command LVdis and can be set to a current command corresponding to the maximum output current. As a result, the circuits in the low-voltage control circuit 126 and the output current control circuit 127 do not operate to affect the voltage value of the connection Vcomp. Since this specific operation details have been described in detail in the previous embodiments, it will not be described again.

As shown in FIG. 4B, when the high-voltage side energy storage device 130 is operating normally, the power converter 120 is selectively operable in the low voltage control mode. At this time, the processing circuit 140 outputs a low-voltage command LVcmd, so that the comparison amplifier OP2 can be combined with the compensation circuit 280 to output the control signal CT2 to the driving circuit 128, according to the voltage error signals of the positive end and the negative end.

Correspondingly, the processing circuit 140 outputs a corresponding high-voltage command HVdis and an output current command Idis to control the high-voltage control circuit 124 and the output current control circuit 127 to be deactivated. Since this specific operation details are described in detail in the previous embodiments, it is not further described again.

As shown in FIG. 4C, the power converter 120 can also selectively operate in the output current control mode when the high-voltage side energy storage device 130 is operating normally. At this time, the processing circuit 140 outputs an output current command Icmd, so that the comparison amplifier OP3 can be combined with the compensation circuit 290 to output the control signal CT3 to the driving circuit 128 according to the voltage error signals of the positive end and the negative end.

Therefore, when the output current control circuit 127 is activated, the output current control circuit 127 can output the third control signal CT3 to the driving circuit 128 according to the output current command Icmd, so that the driving circuit 128 controls the output current Io to be regulated at a target current value corresponding to the output current command Icmd. Since the detailed operation of the output current control circuit 127 is substantially similar to the negative feedback control in the low-voltage control circuit 126, the details thereof will not be further described again.

Accordingly, the processing circuit 140 outputs the corresponding high-voltage command HVdis and low-voltage command LVdis to control the high-voltage control circuit 124 and the low-voltage control circuit 126 to be deactivated. Since this specific operation details have been described in detail in the previous embodiments, it will not be further described again.

As a result, in the embodiment shown in FIG. 3 and FIG. 4A to FIG. 4C, if the high-voltage side energy storage device 130 is decoupled from the dc generator 110 or is in an abnormal state, the processing circuit 140 is configured to output the corresponding high-voltage command, the corresponding low-voltage command and the corresponding output current command to control the high-voltage control circuit 124 to be activated, and the low-voltage control circuit 126 and the output current control circuit 127 are deactivated to stabilize the HVDC voltage V1 towards the corresponding target voltage value.

When the high-voltage side energy storage device 130 is operating normally, the processing circuit 140 is configured to output a corresponding high-voltage command, a low-voltage command, and an output current command to control for the low-voltage control circuit 126 or the output current control circuit 127 to be activated so as to stabilize the LVDC voltage V2 at the corresponding target voltage value, or to stabilize the output current Io at the corresponding target current value.

Figure 5:
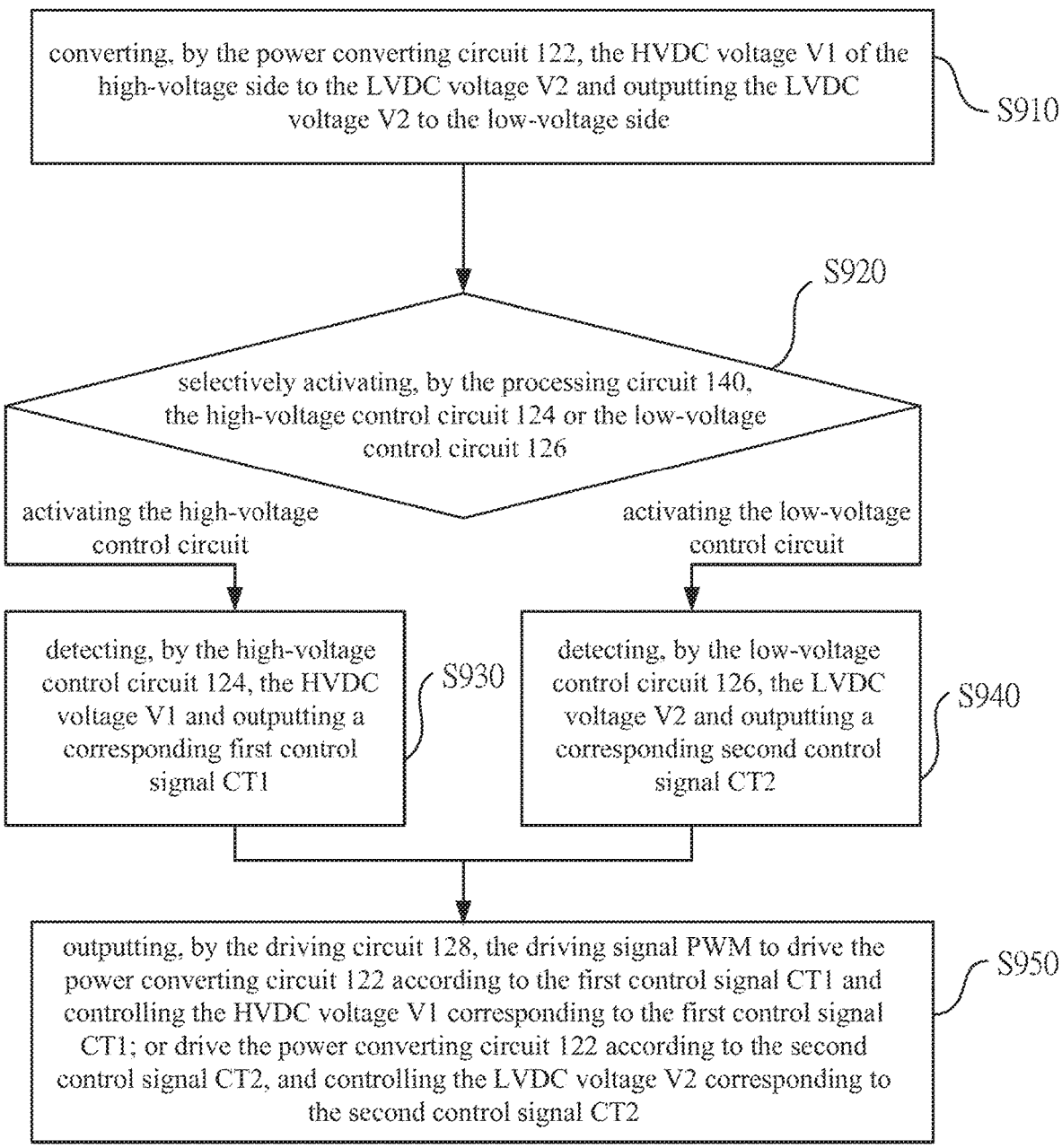
FIG. 5 is a flow chart of a power converter control method according to an embodiment of the present disclosure.

Please refer to FIG. 5 showing a flow chart of a power converter control method. For convenience and clarity of description, the control method 900 of the power converter 120 is described in conjunction with the embodiments shown in FIG. 1 to FIG. 4C, but note that it is not limited thereto. It is envisaged that changes and refinements may be made without departing from the spirit and scope of the present disclosure. As shown in FIG. 5, the control method 900 of the power converter 120 includes steps S910, S920, S930, S940, and S950.

In step S910, converting, by the power converting circuit 122, the HVDC voltage V1 of the high-voltage side to the LVDC voltage V2 and outputting the LVDC voltage V2 to the low-voltage side.

In step S920, selectively activating, by the processing circuit 140, the high-voltage control circuit 124 electrically coupled to the high-voltage side or the low-voltage control circuit 126 electrically coupled to the low-voltage side.

For example, in some embodiments, if the high-voltage side energy storage device 130 is decoupled from the dc generator 110 or is in an abnormal state, the processing circuit 140 outputs the corresponding high-voltage command HVcmd to the high-voltage control circuit 124 to activate the high-voltage control circuit 124.

When the high-voltage control circuit 124 is activated, performing step S930. In step S930, detecting, by the high-voltage control circuit 124, the HVDC voltage V1 and outputting a corresponding first control signal CT1. For example, the high-voltage control circuit 124 can output the first control signal CT1 to the driving circuit 128 according to the detected voltage detection signal Vd1 and the high-voltage command HVcmd.

When the low-voltage control circuit 126 is activated, performing the step S940. In step S940, detecting, by the low-voltage control circuit 126, the LVDC voltage V2 and outputting a corresponding second control signal CT2. For example, the low-voltage control circuit 126 can output a second control signal CT2 to a driving circuit 128 according to the detected voltage detection signal Vd2 and low-voltage command LVcmd.

In step S950, outputting, by the driving circuit 128, the driving signal PWM to drive the power converting circuit 122 according to the first control signal CT1 and controlling the HVDC voltage V1 corresponding to the first control signal CT1; or drive the power converting circuit 122 according to the second control signal CT2, and controlling the LVDC voltage V2 corresponding to the second control signal CT2.

In other words, when the high-voltage control circuit 124 is activated, the driving circuit 128 can control the HVDC voltage V1 to stabilize at the corresponding target voltage value in step S950 according to the first control signal CT1. When the low-voltage control circuit 126 is activated, in the step S950, the driving circuit 128 can control the LVDC voltage V2 to be regulated at the corresponding target voltage value according to the second control signal CT2.

Figure 6:
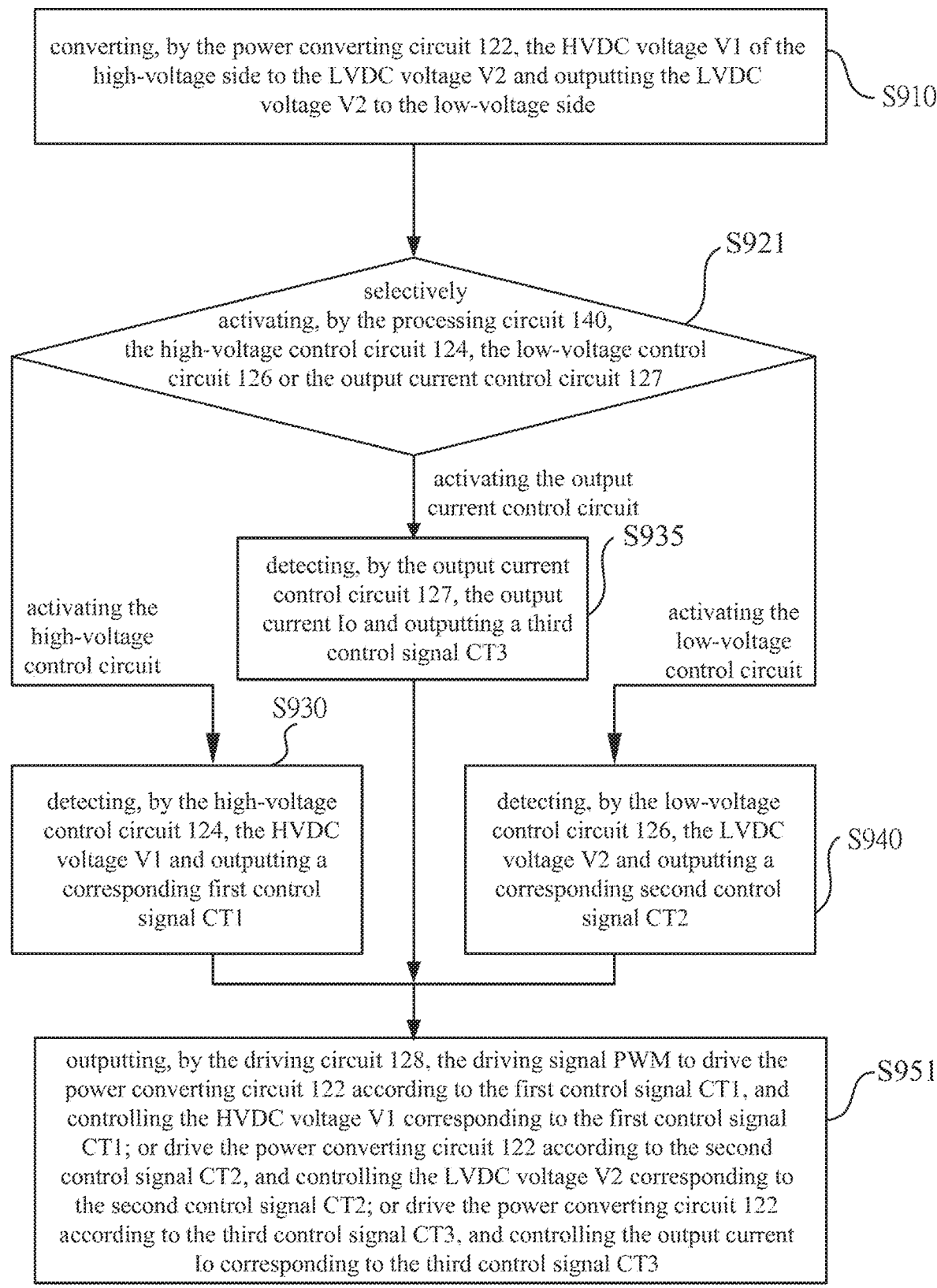
FIG. 6 is a flow chart of a power converter control method according to another embodiment of the present disclosure.

It should be noted that, in some embodiments, step S920 may further include the processing circuit 140 selectively activating: the high-voltage control circuit 124 electrically coupled to the high-voltage side; or the low-voltage control circuit 126 electrically coupled to the low-voltage side; or the output current control circuit 127 electrically coupled to the low-voltage side. Please refer to FIG. 6 showing a flow chart of a power converter control method. In FIG. 6, the same steps associated with the embodiment of FIG. 5 are labeled with the same number for ease of understanding. The specific content which have been explained in the previous paragraph will not be further described to reduce repetition. In step S921, selectively activating, by the processing circuit 140, the high-voltage control circuit 124, the low-voltage control circuit 126 or the output current control circuit 127. When the output current control circuit 127 is activated, performing the step S935. In step S935, detecting, by the output current control circuit 127, the output current Io and outputting a third control signal CT3. In step S951, outputting, by the driving circuit 128, the driving signal PWM to drive the power converting circuit 122 according to the first control signal CT1, and controlling the HVDC voltage V1 corresponding to the first control signal CT1; or drive the power converting circuit 122 according to the second control signal CT2, and controlling the LVDC voltage V2 corresponding to the second control signal CT2. In addition, outputting, by the driving circuit 128, the driving signal PWM to drive the power converting circuit 122 according to the third control signal CT3, and controlling the output current Io corresponding to the third control signal CT3.

The above description includes exemplary operations, but the operations are not necessarily performed in the order described. The order of the operations disclosed in the present disclosure may be changed, or the operations may even be executed simultaneously or partially simultaneously as appropriate, in accordance with the spirit and scope of various embodiments of the present disclosure.

People of ordinary skill in the art can directly understood how this control method 900 is based on the power converting system 100 of the various different embodiments described above to perform such operations and functions, and thus will not be described again.

In summary, in various embodiments of the present disclosure, when the high-voltage side energy storage device 130 is decoupled from the dc generator 110 or is in an abnormal state, the corresponding high-voltage command HVcmd is output through the processing circuit 140 to control the high-voltage control circuit 124 to output the first control signal CT1 to the driving circuit 128 according to the high-voltage command HVcmd. The first control signal CT1 instructs driving circuit 128 control the HVDC voltage V1 to be regulated at the corresponding target voltage value and prevents the overvoltage or overcurrent protection mechanism from being activated. In this way, under the condition that the high-voltage battery abnormally fails or the high-voltage battery cannot work due to the extremely low temperature environment, the power converter 120 can actively stabilize the high-voltage power supply, ensuring that the electric vehicle or the hybrid vehicle can drive normally, thereby improving system reliability.

Although the disclosure has been described in considerable detail with reference to certain embodiments thereof, it will be understood that the embodiments are not intended to limit the disclosure. It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:
1. A power converter, comprising:
   a high-voltage side configured to electrically couple with
     a High Voltage Direct Current source output;

a low-voltage side configured to electrically couple with a Low Voltage Direct Current load;

a power converting circuit configured to receive a High Voltage Direct Current voltage from the high-voltage side and convert the High Voltage Direct Current voltage to a Low Voltage Direct Current voltage to the low-voltage side;

a high-voltage control circuit electrically coupled to the high-voltage side to detect the High Voltage Direct Current voltage and output a first control signal according to the High Voltage Direct Current voltage;

a low-voltage control circuit electrically coupled to the low-voltage side to detect the Low Voltage Direct Current voltage and output a second control signal according to the Low Voltage Direct Current voltage; and a driving circuit configured to selectively output a driving signal to drive the power converting circuit according to the first control signal or the second control signal, wherein the high-voltage control circuit is further configured to receive a high-voltage command from a processing circuit and output the first control signal to the driving circuit according to high-voltage command, and wherein the first control signal instructs the driving circuit to control the High Voltage Direct Current voltage to be regulated at a corresponding target voltage value.

2. The power converter of claim 1, wherein the high-voltage control circuit comprises:

a first voltage divider circuit configured to divide the High Voltage Direct Current voltage and output a first voltage detecting signal;

a first compensation circuit electrically coupled between the first voltage divider circuit and the driving circuit, wherein the first compensation circuit is configured to receive the first voltage detecting signal; and a first comparison amplifier comprising a first end of the first comparison amplifier configured to receive the high-voltage command; a second end of the first comparison amplifier electrically coupled to the first compensation circuit; and an output end of the first comparison amplifier electrically coupled to the driving circuit, wherein the output end of the first comparison amplifier is configured to output the first control signal to the driving circuit.

3. The power converter of claim 1, wherein the low-voltage control circuit is further configured to receive a low-voltage command from a processing circuit and output the second control signal to the driving circuit according to the low-voltage command, and wherein the second control signal instructs the driving circuit to control the Low Voltage Direct Current voltage to be regulated at a corresponding target voltage value.

4. The power converter of claim 3, wherein the low-voltage control circuit comprises:

a second voltage divider circuit configured to divide the Low Voltage Direct Current voltage and output a second voltage detecting signal;

a second compensation circuit electrically coupled between the second voltage divider circuit and the driving circuit, wherein the second compensation circuit is configured to receive the second voltage detecting signal; and a second comparison amplifier comprising a first end of the second comparison amplifier configured to receive the low-voltage command; a second end of the second comparison amplifier electrically coupled to the second compensation circuit; and an output end of the second comparison amplifier electrically coupled to the driving circuit, wherein the output end of the second comparison amplifier is configured to output the second control signal to the driving circuit.

5. The power converter of claim 1, further comprising an output current control circuit electrically coupled to the low-voltage side to detect an output current of the power converting circuit, wherein the output current control circuit is configured to receive an output current command from a processing circuit and output a third control signal to the driving circuit according to the output current and the output current command, and wherein the driving circuit is further configured to selectively output the driving signal to drive the power converting circuit according to the first control signal, the second control signal or the third control signal.

6. The power converter of claim 5, wherein the output current control circuit comprises:

a current detection circuit configured to output an output current detection signal according to the output current;

a third compensation circuit electrically coupled between the current detection circuit and the driving circuit, wherein the third compensation circuit is configured to receive the output current detection signal; and a third comparison amplifier comprising a first end of the third comparison amplifier configured to receive the output current command; a second end of the third comparison amplifier electrically coupled to the third compensation circuit; and an output end of the third comparison amplifier electrically coupled to the driving circuit, wherein the output end of the third comparison amplifier is configured to output the third control signal to the driving circuit.

7. A power converting system, comprising:

a dc generator configured to output a High Voltage Direct Current voltage;

a power converting circuit comprising a high-voltage side electrically coupled to the dc generator and a low-voltage side electrically coupled to a load, wherein the power converting circuit is configured to convert the High Voltage Direct Current voltage to a Low Voltage Direct Current voltage to the low-voltage side;

a high-voltage control circuit electrically coupled to the high-voltage side to detect the High Voltage Direct Current voltage and output a first control signal;

a low-voltage control circuit electrically coupled to the low-voltage side to detect the Low Voltage Direct Current voltage and output a second control signal;

a processing circuit configured to output a high-voltage command to the high-voltage control circuit and control an activation of the high-voltage control circuit, and further configured to output a low-voltage command to the low-voltage control circuit and control an activation of the _ low-voltage control circuit; and a driving circuit configured to selectively output a driving signal to drive the power converting circuit according to the first control signal or the second control signal, wherein the first control signal instructs the driving circuit to control the High Control Direct Current voltage to be regulated at a corresponding target voltage value.

8. The power converting system of claim 7, wherein the high-voltage control circuit comprises:

a first voltage divider circuit configured to divide the High Voltage Direct Current voltage to output a first voltage detecting signal;

a first compensation circuit electrically coupled between the first voltage divider circuit and the driving circuit to receive the first voltage detecting signal; and a first comparison amplifier, a first end of the first comparison amplifier configured to receive the high-voltage command, a second end of the first comparison amplifier electrically coupled to the first compensation circuit, and an output end of the first comparison amplifier electrically coupled to the driving circuit.

9. The power converting system of claim 7, wherein the low-voltage control circuit comprises:

a second voltage divider circuit configured to divide the Low Voltage Direct Current voltage and output a second voltage detecting signal corresponding to a divided Low Voltage Direct Current voltage;

a second compensation circuit electrically coupled between the second voltage divider circuit and the driving circuit, wherein the second compensation circuit is configured to receive the second voltage detecting signal; and a second comparison amplifier comprising a first end of the second comparison amplifier configured to receive the low-voltage command; a second end of the second comparison amplifier electrically coupled to the second compensation circuit; and an output end of the second comparison amplifier electrically coupled to the driving circuit, wherein the output end of the second comparison amplifier is configured to output the second control signal to the driving circuit.

10. The power converting system of claim 7, further comprising:

a high-voltage side energy storage device electrically coupled to the dc generator and the high-voltage side of the power converting circuit;

wherein when the high-voltage side energy storage device is decoupled from the dc generator or is in an abnormal state, the processing circuit outputs the high-voltage command to control the high-voltage control circuit to activate and output the first control signal to the driving circuit, so that the driving circuit controls the High Voltage Direct Current voltage to be regulated at the corresponding target voltage value.

11. The power converting system of claim 10, wherein when the high-voltage side energy storage device is decoupled from the dc generator or is in the abnormal state, the processing circuit further outputs the low-voltage command to control the low-voltage control circuit to be deactivated.

12. The power converting system of claim 10, further comprising:

an output current control circuit electrically coupled to the low-voltage side to detect an output current of the power converting circuit and output a third control signal according to the output current;

wherein the processing circuit is configured to output an output current command to control whether the output current control circuit is activated, and wherein the driving circuit is further configured to selectively output the driving signal according to the first control signal, the second control signal, or the third control signal.

13. The power converting system of claim 12, wherein when the high-voltage side energy storage device is operating normally, the processing circuit outputs all of the high-voltage command, the low-voltage command and the output current command, and activates one of the low-voltage control circuit or the output current control circuit.

14. The power converting system of claim 12, wherein when the low-voltage control circuit is activated:

the low-voltage control circuit outputs the second control signal to the driving circuit according to the low-voltage command;

the driving circuit controls the Low Voltage Direct Current voltage to be regulated at a corresponding target voltage value; and the output current control circuit is deactivated according to the corresponding the output current command.

15. The power converting system of claim 12, wherein when the output current control circuit is activated:

the output current control circuit outputs a third control command to the driving circuit according to the output current command;

the driving circuit controls the output current to be regulated at a corresponding target voltage value; and the low-voltage control circuit is deactivated according to the corresponding low-voltage command.

16. The power converting system of claim 12, wherein when the high-voltage side energy storage device is operating normally, the high-voltage control circuit is deactivated according to the corresponding high-voltage command.

17. The power converting system of claim 12, wherein the output current control circuit comprises:

a current detection circuit configured to output an output current detection signal according to the output current of the power converting circuit;

a third compensation circuit electrically coupled between the current detection circuit and the driving circuit, wherein the third compensation circuit is configured to receive the output current detection signal; and a third comparison amplifier comprising a first end of the third comparison amplifier configured to receive the output current command; a second end of the third comparison amplifier electrically coupled to the third compensation circuit; and an output end of the third comparison amplifier electrically coupled to the driving circuit, wherein the output end of the third comparison amplifier is configured to output the third control signal to the driving circuit.

18. A power converter control method, comprising:

a) providing a power converting circuit having a high-voltage side for coupling with High Voltage Direct Current source output, and a low-voltage side for coupling with a Low Voltage Direct Current load;

b) providing a high-voltage control circuit electrically coupled to the high-voltage side;

c) providing a low-voltage control circuit electrically coupled to the low-voltage side;

d) converting, by the power converting circuit, a High Voltage Direct Current voltage from the high-voltage side to a Low Voltage Direct Current voltage, and outputting the Low Voltage Direct Current voltage to the low-voltage side;

e) selectively activating, by a processing circuit, the high-voltage control circuit or the low-voltage control circuit, wherein if the high-voltage control circuit is activated, the method further comprises:

i-1) detecting, by the high-voltage control circuit, the High Voltage Direct Current voltage, and outputting a first control signal according to a high-voltage command from the processing circuit; and i-2) outputting a driving signal according to the first control signal, by a driving circuit, to drive the power converting circuit and control the High Voltage Direct Current voltage corresponding to the first control signal, and wherein if the low-voltage control circuit is activated, the method further comprises:

ii-1) detecting, by the low-voltage control circuit, the Low Voltage Direct Current voltage, and outputting a second control signal; and ii-2) outputting a driving signal according to the second control signal, by a driving circuit, to drive the power converting circuit and control the Low Voltage Direct Current voltage corresponding to the second control signal.

19. The power converter control method of claim 18, further comprising:

providing a high-voltage side energy storage device coupled to the high-voltage side;

detecting the high-voltage side energy storage device being decoupled or is in an abnormal state:

outputting the high-voltage command, by the processing circuit, to activate the high-voltage control circuit;

outputting, by the high-voltage control circuit, the first control signal to the driving circuit according to the high-voltage command; and stabilizing, by the driving circuit, the High Voltage Direct Current voltage towards a corresponding target voltage value according to the first control signal.

* * * * *